(12) United States Patent
Scherf et al.

(10) Patent No.: US 9,133,710 B2
(45) Date of Patent: Sep. 15, 2015

(54) PLOWING DEVICE

(75) Inventors: Burkhard Hermann Scherf, Bergkamen (DE); Günther Philipp, Schwerte (DE); Dirk Vorwerk, Hagen (DE)

(73) Assignee: THIELE GMBH & CO. KG, Iserlohn (DE)

( * ) Notice: Subject to any disclaimer, the term of this patent is extended or adjusted under 35 U.S.C. 154(b) by 43 days.

(21) Appl. No.: 14/001,404

(22) PCT Filed: Feb. 23, 2012

(86) PCT No.: PCT/DE2012/000166
§ 371 (c)(1),
(2), (4) Date: Oct. 4, 2013

(87) PCT Pub. No.: WO2012/113380
PCT Pub. Date: Aug. 30, 2012

(65) Prior Publication Data
US 2014/0368021 A1    Dec. 18, 2014

(30) Foreign Application Priority Data
Feb. 25, 2011 (DE) .................... 20 2011 003 248 U

(51) Int. Cl.
*E21C 27/34* (2006.01)
*E21C 29/14* (2006.01)
*F16G 13/12* (2006.01)

(52) U.S. Cl.
CPC ................ *E21C 27/34* (2013.01); *E21C 29/14* (2013.01); *F16G 13/12* (2013.01)

(58) Field of Classification Search
CPC ......... E21C 29/14; E21C 25/54; E21C 25/56; E21C 31/06; F16G 13/12; B65G 19/20
USPC .............. 299/34.01, 34.04, 34.09, 34.1, 82.1; 59/78, 84, 92
See application file for complete search history.

(56) References Cited

U.S. PATENT DOCUMENTS

| 4,063,782 A | 12/1977 | Bähre et al. |
| 4,739,875 A * | 4/1988 | Braun et al. ............... 198/735.1 |

(Continued)

FOREIGN PATENT DOCUMENTS

| DE | 40 15 171 | 11/1991 |
| DE | 40 24 818 | 2/1992 |

(Continued)

OTHER PUBLICATIONS

International Search Report issued by the European Patent Office in International Application PCT/DE2012/000166 on Sep. 25, 2012.

(Continued)

*Primary Examiner* — John Kreck
*Assistant Examiner* — Carib Oquendo
(74) *Attorney, Agent, or Firm* — Henry M. Feiereisen LLC.

(57) ABSTRACT

The invention relates to a plowing device having a plow chain which is guided inside a channel (2) having an inner radius (A1) and the chain links of which each have chain bends (5) and chain limbs (6) connecting the latter. In cross section, the chain limbs (6) each have an outside radius that extends along a chord length, wherein the inner radius (A1) of the channel (2) and the outer radius of the chain limbs (6) have a ratio of 1:0.8 to 1:1.2 in relation to one another.

13 Claims, 5 Drawing Sheets

(56) References Cited

U.S. PATENT DOCUMENTS

| | | | |
|---|---|---|---|
| 6,513,647 B1 * | 2/2003 | Merten et al. | 198/733 |
| 6,895,739 B2 | 5/2005 | Dudley et al. | |
| 6,959,769 B2 | 11/2005 | Merten et al. | |
| 2004/0187360 A1 | 9/2004 | Merten et al. | |
| 2005/0113198 A1 * | 5/2005 | Benecke | 474/206 |
| 2010/0293916 A1 * | 11/2010 | Pengg et al. | 59/84 |

FOREIGN PATENT DOCUMENTS

| | | |
|---|---|---|
| DE | 43 32 379 C1 | 9/1994 |
| DE | 102004014092 | 12/2004 |
| DE | 102005013132 | 11/2006 |
| DE | 602 11 133 | 12/2006 |
| EP | 1 495 239 B1 | 1/2005 |
| FR | 2 409 377 | 6/1979 |
| WO | WO 03/087622 | 10/2003 |

OTHER PUBLICATIONS

Chinese Search Report.

* cited by examiner

PLOWING DEVICE

CROSS-REFERENCES TO RELATED APPLICATIONS

This application is the U.S. National Stage of International Application No. PCT/DE2012/000166, filed Feb. 23, 2012, which designated the United States and has been published as International Publication No. WO 2012/113380 and which claims the priority of German Patent Application, Serial No. 20 2011 00. 248.5, filed Feb. 25, 2011, pursuant to 35 U.S.C. 119(a)-(d).

BACKGROUND OF THE INVENTION

The invention relates to a plowing device with a plow chain.

Coal plows are used in underground mining for shearing off coal. The drive is carried out by a pulling member in form of a plow chain, which moves the coal plow back and forth on a longwall parallel to a coal face of a seam between two tracks. The mined debris and coal are transported by a chain scraper conveyor. The chain scraper conveyors are simultaneously guide, roadway and abutment for the coal plow. The plow chain itself is guided and supported in corresponding channels of the plow chain guide.

The plow chain is subject to severe stress in use. In addition to intense tensile and impact loads, there is high friction. This occurs mainly within the channels and deflection zones. The consequent high wear of the individual chain links and of the chain locks which connect the plow chain is countered with different cross sections of the chain links.

EP 1 495 239 B1 describes a plow chain train with a chain lock link guided inside channels. The chain links located ahead of the chain lock links are hereby formed as special chain links and have thickened regions on their chain limbs which extend parallel to the longitudinal direction of the plow chain train, to protect the chain lock link. As a result, the chain lock link is protected from premature wear.

Against the background of increasingly higher powers and speeds to be transmitted, also this construction offers, based on all chain links of a plow chain, potential for improvement. In particular, the friction caused by the contact of the chain links and channels results in addition to corresponding friction losses to a rapid local heating of the edge layer of the individual chain links above the austenitizing temperature of the material. The heating is followed at standstill or free running by an equally rapid cooling, by which friction martensite can form. Thus, in addition to the friction wear of the plow chain, additional crack formation can occur which weakens stress resistance of the individual chain links. The cracks lead to stress peaks and to a premature failure and thus to a costly shutdown of the entire plowing device.

SUMMARY OF THE INVENTION

The invention is thus based on the object to so improve a plowing device with a plow chain formed as a link chain as to prolong the service life of the plow chain and to increase the useful life.

This object is attained according to the invention by a plowing device with a plow chain formed as a link chain and guided within a channel with an inner radius and including chain links which each have chain bends and chain limbs, wherein the chain limbs in cross section each have an outer radius extending over a chord length, wherein the inner radius of the channel and the outer radius of the chain limbs have a ratio of 1:0.8 to 1:1.2 in relation to one another.

The thus created plowing device is operated with a plane chain, with the individual chain links having each chain bends and chain limbs that connect these chain bends. The plow chain involves a link chain. The plow chain is guided in a channel of a plow chain guide which has an inner radius substantially suited to the dimensions of the plow chain.

The chain limbs have each in cross section an outer radius extending over a chord length. According to the invention, the inner radius of the channel and the outer radius of the chain limb have a ratio of 1:0.8 to 1:1.2 in relation to one another.

The particular advantage resides in a greatest possible bearing surface between the outer radius of the chain limbs and the inner radius of the channel. Friction forces encountered during operation are thereby transmitted across a large area, thereby minimizing tension and accompanying wear of the chain limbs.

Advantageous configurations of the inventive idea are the subject matter of the dependent claims.

According to a variant, the inner radius of the channel and the outer radius of the chain limbs have a ratio of 1:1.0 to 1:1.2 in relation to one another.

A thickness of the chain limb and the chord length of the outer radius have a ratio of 1:0.5 to 1:1.15 in relation to one another. Preferably, the thicknesses of the chain limbs and the chord length have a ratio of 1:1.0 to 1.15 in relation to one another. In combination with a ratio of the inner radius of the channel and the outer radius of the chain limbs of more than 1:1, a 2-line contact is realized between the chain limbs and the inner surface of the channel.

As a result of the presence of the 2-line contact at least in the initial phase of use of the plow chain, heat generated by friction is reduced and also better carried away. As a consequence, the possible formation of a martensite layer is delayed or even prevented. This increases service life of the individual links and therefore of the plow chain as a whole.

The outer radius of the chain limbs extends with its chord length over a circumferential region of the chain limbs of 50° to 100°, in particular 53° to 98°. The size of the segment area between chain limb and inner surface of the channel, as formed by the outer radius and its chord length is hereby adapted to the respective requirements.

The opposing inner sides of the chain limbs within the individual chain links extend in parallel relationship. The resulting, at least partially, constant inner width of the individual chain links inside the pitch enables the individual chain links, which engage within one another via the chain bends, to be freely inserted into each other in longitudinal direction.

Basically, the opposing inner sides of the chain limbs can also extend non-parallel so that the respective chain bend inside the pitch of an adjacent chain link is clearly defined, for example by a tapering of the inner width, in its freedom of movement. The opposing inner sides of the chain limbs can thus be designed such that the chain bend of an adjacent chain link experiences only a slight freedom of movement within the pitch of the adjacent chain link.

Also the outer sides of the chain limbs in opposition to the inner sides of the chain limbs extend in parallel relationship. As a result, a greatest possible bearing surface is made possible between the inner side of the channel and the chain limbs.

The chain limbs of the individual chain links respectively extending between the chain bends have hereby a constant cross sectional shape. Basically, the individual chain limb can also have a cross sectional shape corresponding to the respective requirements, wherein the cross sectional shape of the opposing chain limbs differ for example from one another. Furthermore, the respective cross sectional shape of the chain limb can also change along the chain limb. Also the chain bends of the individual chain links each have a constant circular cross section with transition sections arranged towards the chain limbs. The transition sections lead the respective cross sections of the chain limbs and chain bends into one another. As a result, in particular the outer circumference of the chain link is aligned from the chain limbs to the chain bends.

A transition zone is respectively arranged between the outer radius and an opposing inner radius of the individual chain limbs. The transition zone has in cross section of the chain limb, an arcuate, for example S-shaped or double S-shaped profile. As a result, the respective contour of the outer radius is matched over its respective width and its peripheral region to the inner radius of the chain limb. By this arrangement, no abrupt and thereby sharp-edge radius change is produced, so that the two different radii of the inner radius and the outer radius are realized through roundings and/or arcuate profiles. In particular, the roundings prevent a possible notch effect of the material in this region.

The regions that touch and rub against each other have a greatest possible contact area in relation to each other so as to realize a more favorable friction behavior between the chain limbs and the guide tube already at the beginning of use as opposed to conventional round steel chains. The surface pressure is thereby reduced.

The plowing device provides that an outer width of the chain limbs, respectively extending in the transverse direction of the chain links, and the inner radius of the channel have a ratio between 1:0.5 and 1:0.6 in relation to one another. Thus, the inner diameter of the channel is basically located beyond the outer width of the chain links in order to effectively prevent a possible jam. Depending on a requirement at hand, the clearance between the inner wall of the channel and the outer dimensions of the regions of the chain links which are in contact with the channel can be selected.

Advantageously, the channel has a circular cross section. The channel can hereby have openings both in transverse and also in longitudinal directions. Advantageously, the wall of the channel is closed so that no unnecessary edges are produced which promote a premature wear of the plow chain. The inner circular cross section of the channel provides, in relation to its inner radius, for the individual chain link always a constant distance to its wall so that the chain link is guided and supported uniformly.

The invention provides that the opposing chain limbs of a chain link can be connected with one another by a web extending there between. The web can subsequently be connected, at least in regions, to the chain limbs. Advantageously, the connection between the web and chain limbs is realized by a material joint, for example by welding. Furthermore, the web can also be connected in one piece with the chain limbs of the chain links.

The web can have in cross section a polygonal or round shape. Preferably, the web is constructed in cross section round or oval in order to enable a movement of the chain links amongst each other that is as jam-free as possible in a possible contact region with the chain bends and/or chain limbs of the chain links.

Furthermore, the web can have a thickened cross section towards the chain limbs and hereby be tapered in midsection between the limbs. The thickening and tapering may hereby relate to the whole cross section or only to the thickness of the web extending between the chain limbs and the chain bends.

The individual chain links, in particular the chain limbs thereof, are stabilized by the web. Furthermore, nesting of interlocked links into one another is limited by the fact that the respective chain bend impacts the web during its manipulation within the pitch of the adjacent chain link.

The plowing device according to the invention includes a link chain in the form of a plow chain which has a much longer service life and useful life by conforming the outer radius of the chain limb with respect to the inner radius of the channel. In particular, the configuration of the chain limb can have a 2-line contact with the inner surface of the channel so that the premature formation of martensite is reduced. Overall, a plow chain that is easy to manufacture, lightweight and without significant cross sectional jumps is realized and ensures a longer and thereby more economical use compared to conventional constructions.

BRIEF DESCRIPTION OF THE DRAWING

The present invention is now described with reference to some schematically shown exemplary embodiments in more detail. It is shown in.

DETAILED DESCRIPTION OF PREFERRED EMBODIMENTS

Figure 1:
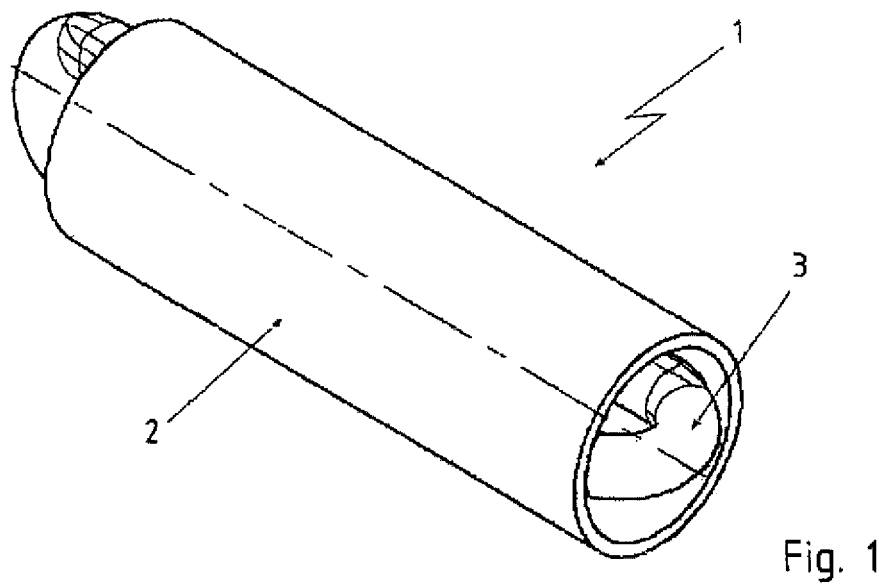
FIG. 1 a perspective representation of a portion of a plowing device according to the invention.

FIG. 1 shows a portion of a plowing device 1 according to the invention. The plowing device 1 includes a channel 2 of a plow chain guide, not shown in greater detail, in which a plow chain 3 is guided and supported.

Figure 2:
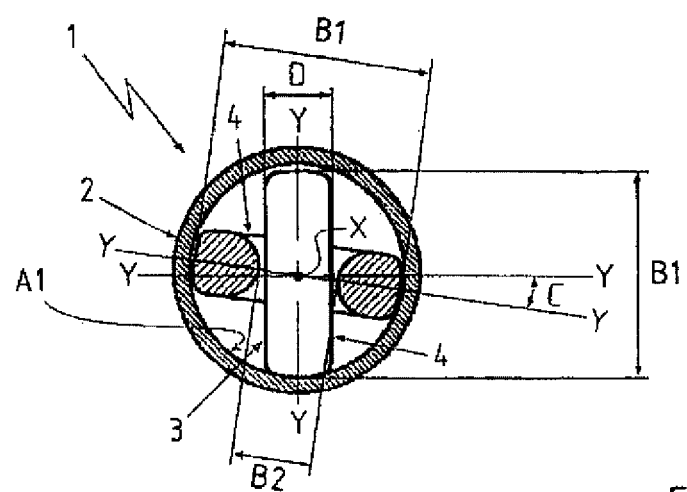
FIG. 2 a cross section through the plowing device according to the invention of FIG. 1.

FIG. 2 illustrates the guidance of the plow chain 3 within the channel 2 by way of a sectional view through the plowing device 1 of FIG. 1 The channel 2 has a circular cross section. The plow chain 3 is guided inside the channel 2 with clearance to its inner wall having an inner radius A1. The clearance is in a range established by the ratio of outer width B1 of the chain link 4 and the inner radius A1 of the channel 2 between 1:0.5 and 1:0.6. As can be seen in the illustration, the plow chain 3 is assembled from chain links 4 arranged successively and interlocking in the channel 2. The individual chain links 4 have identical outer width B1 and thickness D in the direction of their respective transverse axes Y and thus in the transverse direction. The plow chain 3 is hereby divided into horizontal and vertical chain links 4 which have a clearance between them to prevent kinks. The clearance between the individual chain links 4 is defined by the difference of the thickness D and an embracing inner width B2 of the chain links 4. As a result of the clearance, the interconnected chain links 4 with their respective transverse axes Y are rotatable relative to one another by an angle C of maximal 8° about a longitudinal axis of the chain link 4.

Figure 3:
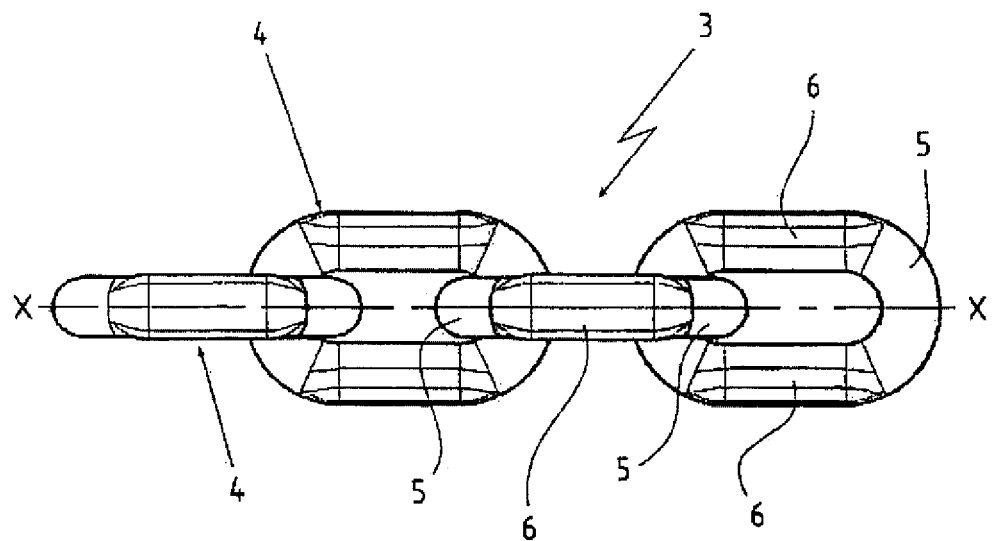
FIG. 3 a view of a portion of a plow chain.

FIG. 3 shows the plow chain 3 of FIGS. 1 and 2 by way of a side view from outside of the channel 2 of FIGS. 1 and 2. This view illustrates again that the plow chain 3 is composed in the direction of the longitudinal axis X from a series of individual chain links 4 which are movable into one another. Each single chain link 4 is composed of two chain bends 5 and two chain limbs 6. The individual chain links 4 embrace hereby with their respective chain bends 5. The chain bends 5 of each chain link 4 are connected to each other by the rectilinear chain limbs 6.

Figure 4:
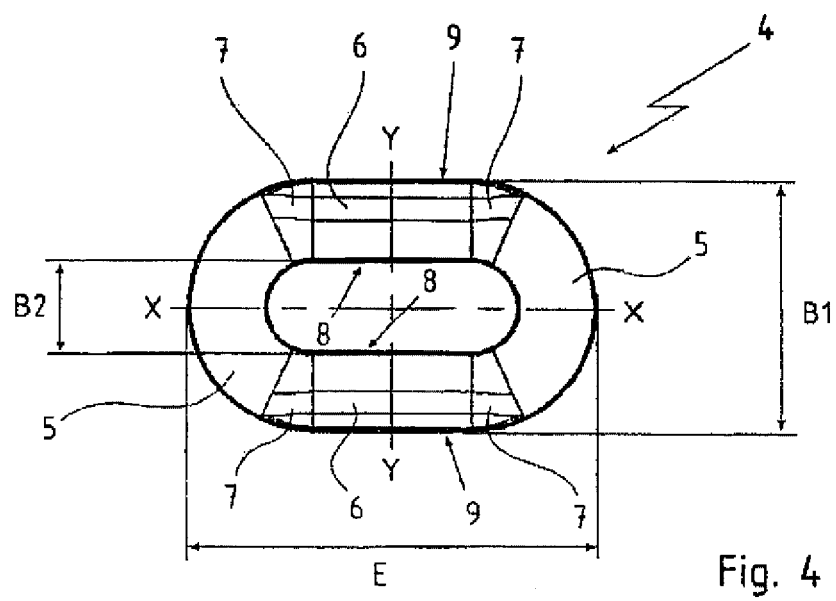
FIG. 4 a plan view of a single chain link of a plow chain.

FIG. 4 illustrates the structure of a single chain link 4 of the plow chain 3 of FIG. 3 by a plan view. The chain link 4 has an oval shape with an outer length E extending in direction of its longitudinal axis X. The outer length E extends between the outer roundings of the opposing chain bends 5. The chain bends 5 and the chain limbs 6 connecting them transit into each other through the connecting transition sections 7. The transition sections 7 match hereby the respective cross sectional shape of the chain bends 5 and the chain limbs 6. The opposing inner sides 8 of both chain limbs 6 within the chain link 4 extend parallel to one another. Also the outer sides 9 of the chain limb 6 in opposition to the inner sides 8 extend in parallel relation between the transition sections 7. The chain bends 5 have each a constant cross sectional profile between the transition sections 7.

Figure 5:
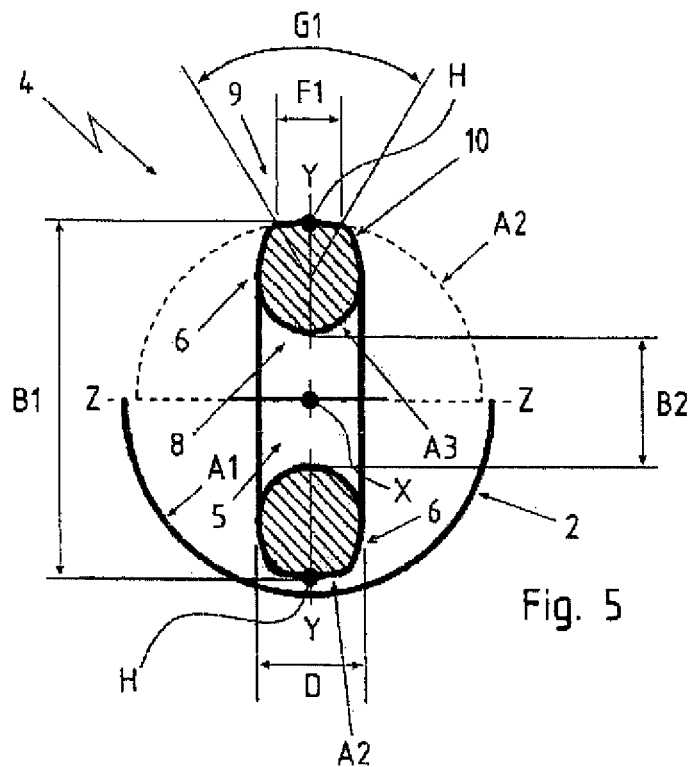
FIG. 5 a first cross section through a chain link.

FIG. 5 shows a section through the chain limb 6 of the chain link 4. With reference to the illustration, the channel 2, specifically its inner wall with the inner radius A1, is indicated in the lower region of the chain link 4 in half. It is easy to see that the width B1 extending in the direction of transverse axis Y of the chain link 4 extends between the apexes H of the two outer radii A2.

The respective outer side 9 of the chain limbs 6 is rounded by an outer radius A2 in relation to the inner radius A1 of the channel 2. The outer radius A2 has a chord length F1 which extends over a circumferential region G1 of the outer side 9 of the chain limb 6. The not shown center of the outer radius A2 is located on the transverse axis Y. Its position is obtained from the apex H of the outer radius A2. The inner radius A1 of the channel 2 and of the outer radius A2 of the chain limb 6 have a ratio of 1:0.8 to under 1:1.0 in relation to each other. As the outer radius A2 of the chain limb 6 is smaller than the inner radius A1, one of its outer sides is in a line contact with its inner wall of the channel 2. In the illustration of FIG. 5, one of the apexes H of the outer radii A2 of the chain limb 6 is in a line contact with the inner radius A1 of the channel 2.

The inner side 8 of the chain limb 6 opposite to the respective outer radius A2 is rounded via an inner radius A3. The thickness D is identical for the chain bends 5 and the chain limbs 6 and their respective transition sections 7. Furthermore, the chain limbs 6 have in their cross section a transition zone 10 which connects the outer radius A2 to the inner radius A3.

Figure 6:
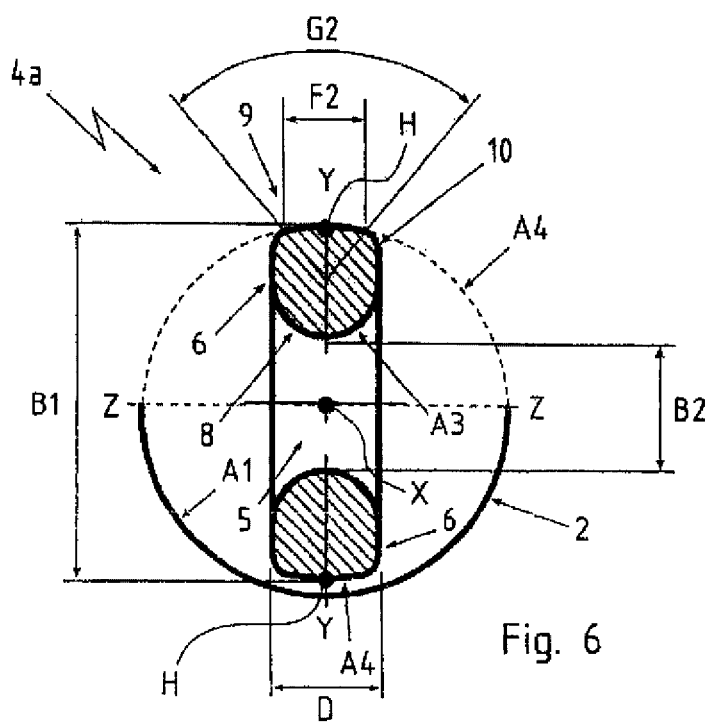
FIG. 6 a variant of a chain link according to the representation of FIG. 5.

FIG. 6 shows a variant of the chain link 4 in the form of a chain link 4a. Compared to the chain link 4 of FIG. 5, it has a modified design of the outer sides 9 of the chain limbs 6. The modification relates to the outer radius A4 which is identical to the inner radius A1 of the channel 2. The ratio of inner radius A1 of the channel 2 to outer radius A4 of the chain limb 6 is therefore 1:1. Its greater chord length F2 is accompanied by an equally greater peripheral region G2 of the outer radius A4 of the chain limb 6. As a result of the identical inner radius A1 of the channel 2 and outer radius A4, at least one of the chain limbs 6 a flat contact is realized between the peripheral portion G2 and the inner wall of the channel 2. Accordingly, the entire peripheral region G2 of the outer radius A4 is in flat contact with the inner radius A1 of the channel 2.

Figure 7:
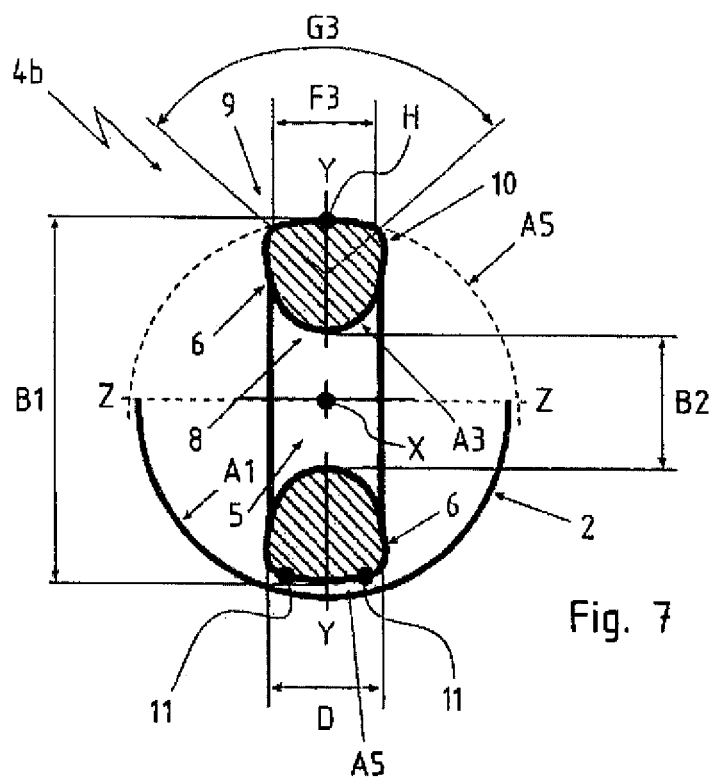
FIG. 7 a further variant of a chain link according to the representations of FIGS. 5 and 6.

FIG. 7 shows a further variant of the chain links 4, 4a of FIGS. 5 and 6 in the form of a chain link 4b. Compared with the chord lengths F1, F2 of the outer radius A2, A4 of the chain limb 6 shown in FIGS. 5 and 6, it has a greater chord length F3 which extends beyond the thickness D of the chain limb 6 of the link chain 4b. Furthermore, the chain link 4b has a greater peripheral region G3 than the peripheral regions G1, G2 of FIGS. 5 and 6. As a result, the transition zone 10 also overlaps the thickness D. Compared to the outer radii A2, A4 of the chain links 4, 4a of FIGS. 5 and 6, the chain link 4b has a greater outer radius A5. The inner radius A1 of the channel 2 and the outer radius A5 of the chain limb 6 have a ratio between 1:1.0 and including 1:1.2 in relation to one another. As the outer radius A5 of the chain limb 6 exceeds the inner radius A1 of the channel 2, the peripheral region G3 has a two-line contact with the inner wall of the channel 2. The peripheral region G3 with the outer radius A5 of at least one chain limb 6 is in contact with the inner radius A1 of the channel 2 via two lines 11.

Figure 8:
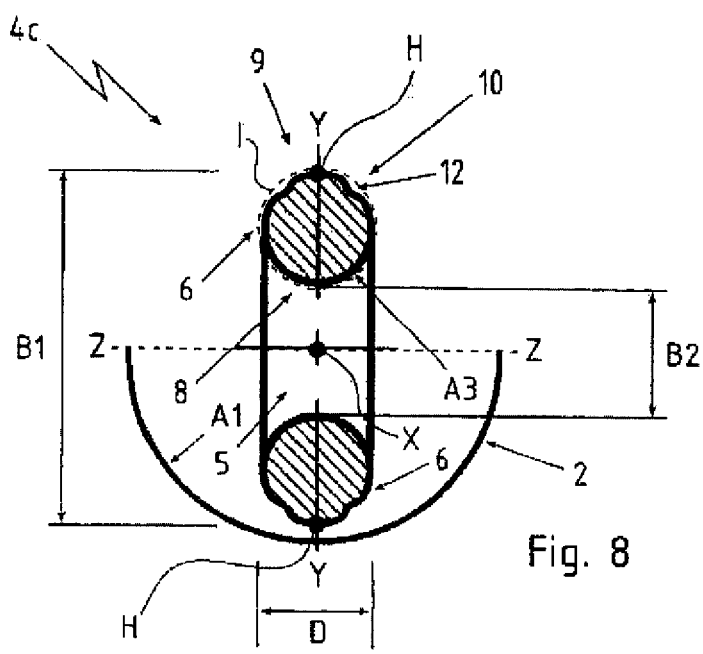
FIG. 8 a variant of a chain link in accordance with the representations of FIGS. 5, 6 and 7 modified in the transition zones of the individual radii.

FIG. 8 shows in detail the pronounced transition zone 10 of a chain link 4c which is rounded S-shaped, in particular double-S-shaped. This variant of the configuration of the transition zone 10 forms an embossment 12 which is to be understood as an indentation extending into the cross section of the chain limb 6, with the inner radius A3 of chain limb 6 describing an envelope circle I and the embossment 12 lying within this envelope circle I.

The embossment 12 is provided to protect the chain limb 6 as reliably as possible from deep cracking. This is against the background that the friction caused by the touching of chain link 4c and channel 2 results in addition to respective friction losses in a rapid local heating of the surface layer of the chain link 4c beyond the austenitizing temperature of the material. This is followed at standstill or free running by a cooling which is as rapid so as to be able to form friction martensite. Thus, in addition to the friction wear of the plow chain, an additional crack formation occurs which weakens the stress resistance of the individual chain links 4c. The cracks lead to stress peaks and to a premature failure and thus to an expensive production stop of the entire plowing device 1.

The configuration of the transition zone 10 and the thus forming embossments 12 interrupts the cracks formed in the martensite layer so that the need for replacement of the plow chain 3 is delayed and failure of individual chain links 4c is prevented.

Figure 9:
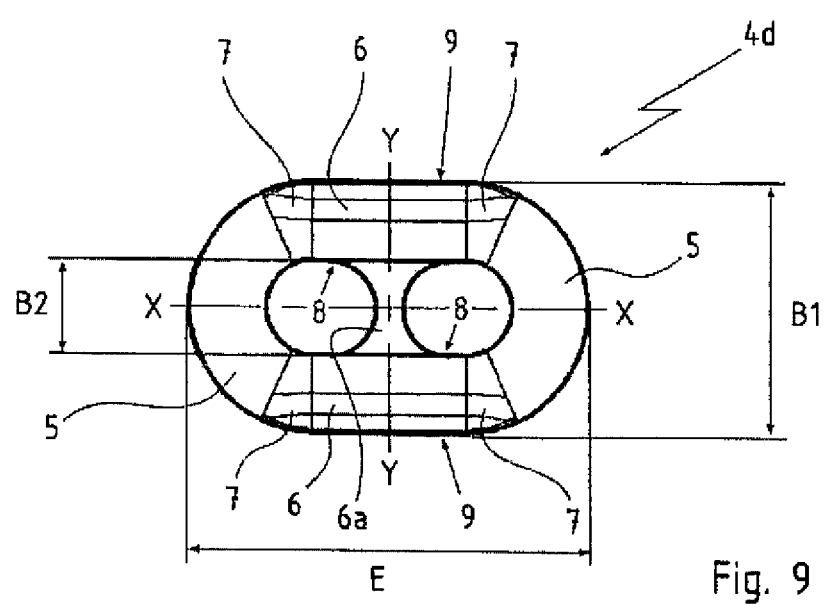
FIG. 9 a variant of the chain link of FIG. 4 in same representation.

FIG. 9 shows a variant of the chain link 4 already shown in FIG. 4. In the form of a chain link 4d, it has a web 6a connecting the chain limbs 6 and formed in one piece with the chain link 4d. The web 6 interrupts the pitch of the chain link 4d in midsection. The web 6a is formed so as to correspond to the shape of the chain bends 5 from the inner side 8 as a mirror image.

In practice, the plowing device 1 according to the invention is first oriented with its individual components to the respective requirements at hand. In particular, the respective cross sectional shape of the chain limbs 6 is hereby suited in combination with the inner radius A1 to the channel. Depending on the design, both the outer radius A2, A4, A5 and its respective chord length F1 to F3 and the peripheral region G1 to G3 are adjusted so that the smallest possible wear of the chain links 4, 4a, 4b is realized within the channel 2 of the plowing device 1. Depending on the configuration, the outer radius A5 of the chain limb 6 can hereby exceed the inner radius A1 of the channel 2 so as to establish a 2-line contact.

REFERENCE SIGNS

1—plowing device
2—channel of 1

3—plow chain of 1
4—chain link of 3
4a—chain link of 3
4b—chain link of 3
4c—chain link of 3
4d—chain link of 3
5—chain bend of 4, 4a-d
6—chain limb of 4, 4a-d
6a—web of 4d
7—transition section between 5 and 6
8—inner side of 6
9—outer side of 6
10—transition zone between A2 and A3, A3 and A4, A3 and A5
11—lines between A1 and A5
12—embossment of 6
A1—inner radius of 2
A2—outer radius of 6
A3—inner radius of 6
A4—outer radius of 6
A5—outer radius of 6
B1—width, outside of 4, 4a-d
B2 width, inside of 4, 4a-d
C—angle between 4, 4a-d
D—thickness of 4, 4a-d
E—length, outside of 4, 4a-d
F1—chord length of A2
F2—chord length of A4
F3—chord length of A5
G1—peripheral region of F1
G2—peripheral region of F2
G3—peripheral region of F3
H—apex of A2, A4, A5
I—envelope circle of A3
X—longitudinal axis
Y—transverse axis
Z—vertical axis.

What is claimed is:

1. A plowing device, comprising a plow chain guided inside a channel with an inner radius and having chain links, each chain link including chain bends and chain limbs, wherein the chain limbs in a cross-section each have an outer radius extending over a chord length, wherein the inner radius of the channel and the outer radius of the chain limbs have a ratio of 1:1.0 to 1:1.2 in relation to one another.

2. The plowing device of claim 1, wherein the chain limbs have a thickness, said thickness and the chord length having a ratio of 1:0.5 to 1:1.15 in relation to one another.

3. The plowing device of claim 1, wherein the chain limbs have a thickness, said thickness and the chord length have a ratio of 1:1.0 to 1:1.15 in relation to one another.

4. The plowing device of claim 1, wherein the outer radius extends over a peripheral region between 50° to 100°.

5. The plowing device of claim 1, wherein opposing inner sides of the chain limbs within the chain links extend in parallel relationship.

6. The plowing device of claim 5, wherein outer sides of the chain limbs in opposition to the inner sides of the chain limbs extend in parallel relationship.

7. The plowing device of claim 1, wherein each of the chain limbs of the individual chain links extending between the chain bends has a uniform cross sectional shape.

8. The plowing device of claim 1, wherein each of the chain bends has a constant circular cross-section with a transition zone arranged toward the chain limbs.

9. The plowing device of claim 1, wherein each chain link has a transition region arranged between the outer radius and an inner radius of the chain limb.

10. The plowing device of claim 9, wherein the transition region has in cross-section of the chain limb a straight or S-shaped curved profile.

11. The plowing device of claim 1, wherein the channel has a circular cross section.

12. The plowing device of claim 1, wherein the chain limbs of the chain links are connected to each other via a web.

13. A plowing device, comprising a plow chain guided inside a channel with an inner radius and having chain links, each chain link including chain bends and chain limbs, wherein the chain limbs in a cross-section each have an outer radius extending over a chord length, wherein the inner radius of the channel and the outer radius of the chain limbs have a ratio of 1:0.8 to 1:1.2 in relation to one another, wherein each chain link has an outer width extending in a transverse direction of the chain link, said outer width and the inner radius of the channel having a ratio between 1:0.5 and 1:0.6 in relation to one another.

* * * * *